(12) United States Patent
Chen Lin

(10) Patent No.: US 7,418,787 B2
(45) Date of Patent: Sep. 2, 2008

(54) CUTTING MAT

(76) Inventor: Tsai-Lian Chen Lin, No. 6, Mingde St., Huatan Township, Changhua County (TW)

( * ) Notice: Subject to any disclaimer, the term of this patent is extended or adjusted under 35 U.S.C. 154(b) by 269 days.

(21) Appl. No.: 11/425,172

(22) Filed: Jun. 20, 2006

(65) Prior Publication Data
US 2007/0289425 A1 Dec. 20, 2007

(51) Int. Cl.
*G01B 5/00* (2006.01)
*B43L 13/00* (2006.01)
*A47B 11/00* (2006.01)

(52) U.S. Cl. .............................. 33/573; 33/435; 33/497; 108/103; 248/349.1; 269/289 R

(58) Field of Classification Search .................. 33/573, 33/562, 568–571, 435, 1 AA, 495–500; 269/57, 269/71–74, 289 R, 302.1, 303; 108/139, 108/103, 104, 94; 248/349.1, 521; 211/163, 211/78, 144, 131.1
See application file for complete search history.

(56) References Cited

U.S. PATENT DOCUMENTS

| | | | | |
|---|---|---|---|---|
| 1,859,352 A * | 5/1932 | Albee | ............................. | 47/39 |
| 2,868,145 A * | 1/1959 | Brooke | ........................ | 249/158 |
| 2,873,938 A * | 2/1959 | Crawford, Jr. | .............. | 273/280 |
| 4,905,610 A * | 3/1990 | Kelley | ........................ | 108/103 |
| 6,141,882 A * | 11/2000 | Syken | .......................... | 33/471 |
| 6,330,752 B1 * | 12/2001 | Ellam | ........................... | 33/471 |
| 7,047,655 B2 * | 5/2006 | Larsson | ........................ | 33/471 |
| 2005/0252428 A1* | 11/2005 | Yamin | ........................ | 108/139 |
| 2006/0060052 A1* | 3/2006 | Okada | .......................... | 83/659 |
| 2007/0289425 A1* | 12/2007 | Chen Lin | ...................... | 83/574 |

\* cited by examiner

*Primary Examiner*—G. Bradley Bennett
*Assistant Examiner*—Amy Cohen Johnson
(74) *Attorney, Agent, or Firm*—Banger Shia

(57) ABSTRACT

A cutting mat comprises: a baseboard defined with an assembling hole and at least one notch on a side of the assembling hole, a positioning member detachably disposed in the assembling hole, and a cutting board. The positioning member includes a circular body and at least one positioning protrusion formed on a side of the circular body and located in a corresponding position to the notch of the baseboard. The cutting board is formed at the bottom thereof with a circular recess for engaging the circular body of the positioning member, so that the cutting board is rotatably superposed on the baseboard. When the positioning member is inversely disposed with the positioning protrusion being protruded from the top surface of the baseboard, and the circular body and the positioning protrusion are partially received in the assembling hole and the notch of the baseboard, the circular recess and the positioning notch of the cutting board will be engaged with the positioning member and a part of the positioning protrusions; as a result, the cutting board is unrotatably positioned on the baseboard.

2 Claims, 9 Drawing Sheets

CUTTING MAT

BACKGROUND OF THE INVENTION

1. Field of the Invention

The present invention relates to an office product, and more particularly to a cutting mat that is both fixable and ratable.

2. Description of the Prior Art

In a cutting operation, the object to be cut is usually laid on a cutting mat so as to protect the cutting blade from damaging the surface of a table. Although cut marks will be left on the surface of the cutting mat after cutting operation, it doesn't affect the next round of cutting operation, which is why the cutting mat is widely used.

However, the cutting operation does not just include linear cutting, it also includes arc-shaped cutting, circular cutting and other forms of cutting. When an ordinary cutting mat is used in these forms of cutting operation, the user must turn his wrist or even has to stand up to adjust to a right angle, or might have to adjust the position of the cutting mat, causing inconveniences.

Later, a rotatable cutting mat was developed to overcome the above-mentioned inconveniences, as shown in FIGS. 1 and 2, which comprises a baseboard 80 and a cutting board 81. The bottom surface of the baseboard 80 is covered with an antiskid layer 82, and a circular hole 83 is formed in the center of the baseboard 80. The top surface of the cutting board 81 is covered with a cut proof layer 84, and a circular block 85 is provided on the bottom surface of the cutting board 81 and is to be pivotally received in the circular hole 83 of the baseboard 80, so as to make the cutting board 81 rotatable relative to the baseboard 80.

It is very convenient for the user to do an arc-shaped or circular cutting operation just by rotating the cutting board 81 without moving the user's wrists or body. However, when doing a linear cutting, the cutting board 81 is also likely to rotate, and the cutting board 81 can't be laid flat on the table because of the circular block 85 on the bottom surface thereof, thus causing trouble in linear cutting.

To overcome the above-mentioned trouble, another magnetic type cutting mat was developed to overcome the inconveniences, which is shown in FIGS. 3 and 4, and also comprises a baseboard 90 and a cutting board 91. A plurality of antiskid pieces 92 are arranged at the corners and the center of the bottom surface of the baseboard 90. A magnet 93 is embedded on the top surface of the baseboard 90 and is located opposite to the antiskid piece 92 at the center of the bottom surface of the baseboard 90. The top surface of the cutting board 91 is covered with a cut-proof layer 94, and another magnet 95 is embedded on the bottom surface of the cutting board 91 and located correspondingly to the magnet 93 of the baseboard 90. By the attracting force between the magnets 93 and 95, the user can rotate the cutting board 91 with respect to the baseboard 90. In addition, the magnet 95 is embedded in the center of the bottom surface of the cutting board 91, allowing the cutting board 91 to be laid flat on a table. However, the cutting board 91 is likely to move or fall when it is subjected to a force in the horizontal direction since the cutting board 91 is just superposed on the baseboard 90 by the magnetic attractive force therebetween, adversely affecting the cutting operation. Furthermore, the bottom surface of the cutting board 91 and the top surface of the baseboard 90 are always treated to be smooth enough so that the cutting board will also rotate smoothly. As a result, the cutting board 91 is more likely to skid on the table when it is used independently without the baseboard 90.

The present invention has arisen to mitigate and/or obviate the afore-described disadvantages.

SUMMARY OF THE INVENTION

The primary objective of the present invention is to provide a cutting mat that is both fixable and ratable, and it is suitable for both arc-shaped cutting and linear cutting operations.

To achieve the above-mentioned goal, a cutting mat in accordance with the present invention comprises: a baseboard, a positioning member, and a cutting board. A bottom surface of the baseboard is covered with an antiskid layer, an assembling hole is formed in the baseboard, and at least one notch is formed on a side of the assembling hole. The positioning member includes a circular body and at least one positioning protrusion formed on a side of the circular body and located correspondingly to the notch of the baseboard. The circular body of the positioning member is disposed in the assembling hole of the baseboard, a thickness of the circular body is greater than a height of the assembling hole, so that the circular body protrudes from a top surface of the baseboard. The positioning protrusion is thinner than the circular portion and is received in the notch and flush with a surface of the baseboard. The cutting board includes a body and a cut proof layer coated on a top surface of the body, a circular recess is formed in a bottom surface of the cutting board for engaging with the circular body of the positioning member, so that the cutting board is rotatably superposed on the baseboard, at least one positioning notch formed at a side of the circular recess and located correspondingly to the positioning protrusion of the positioning member. When the positioning member is inversely disposed with the positioning protrusion being protruded from the top surface of the baseboard, and the circular body and the positioning protrusion are partially received in the assembling hole and the notch of the baseboard, the circular recess and the positioning notch of the cutting board will be engaged with the positioning member and a part of the positioning protrusions, in this way, the cutting board is unrotatably positioned on the baseboard.

DETAILED DESCRIPTION OF THE PREFERRED EMBODIMENTS

Figure 1:
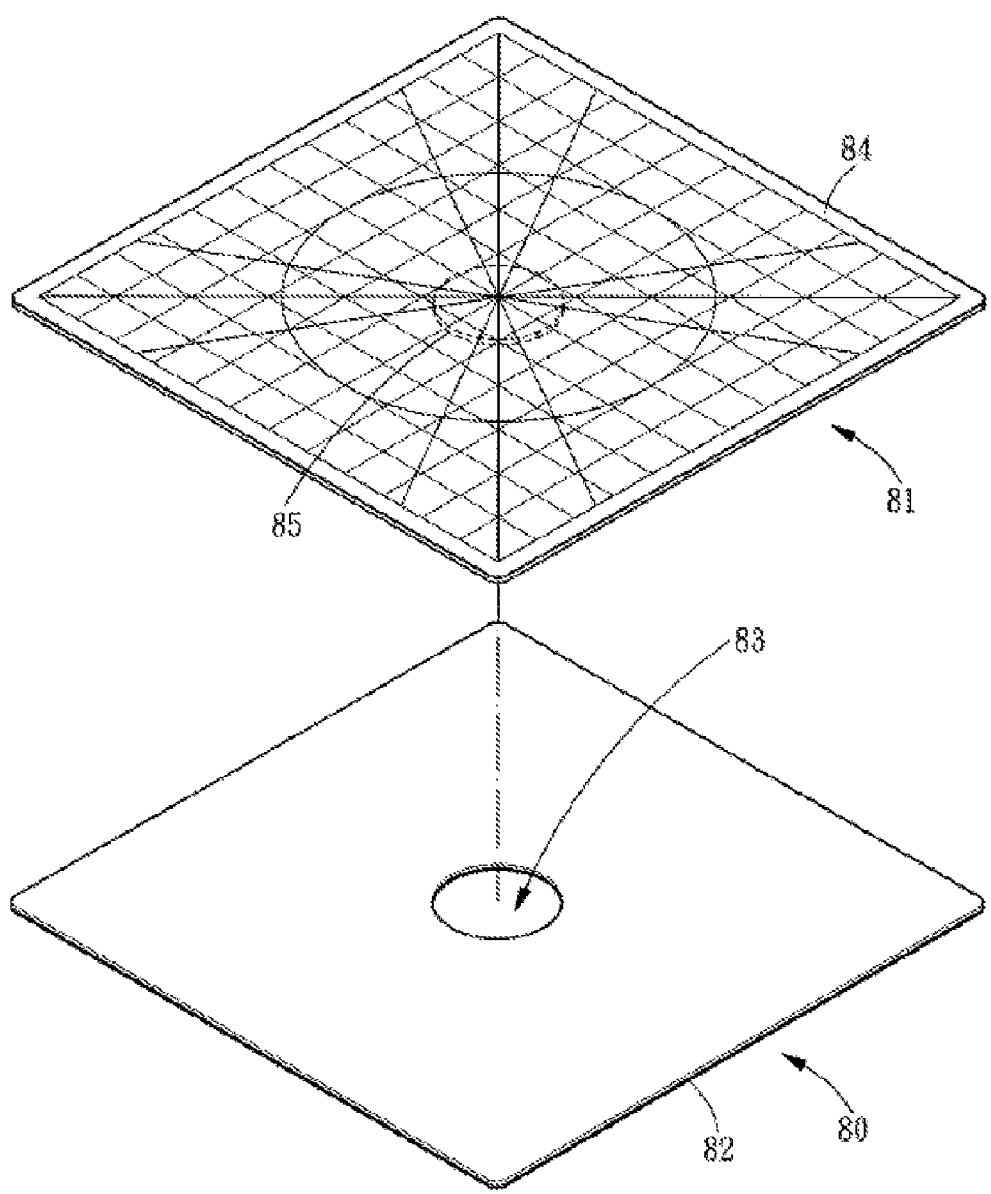
FIG. 1 is an exploded view of a conventional cutting mat.
Figure 2:
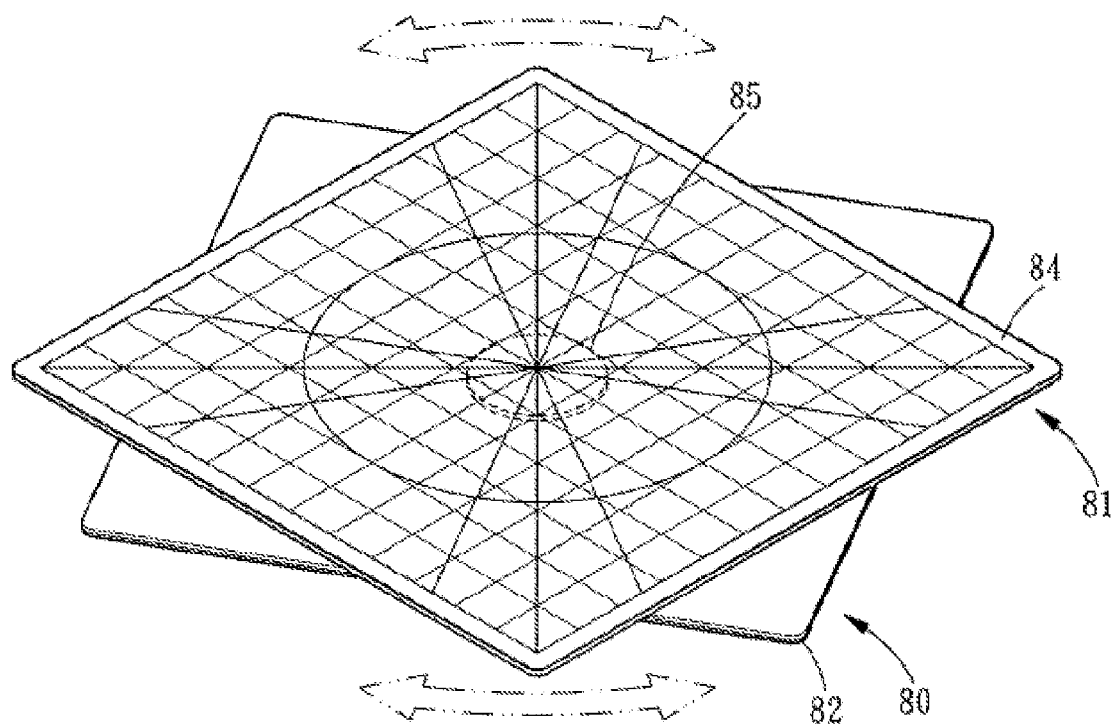
FIG. 2 is a perspective view of the conventional cutting mat of FIG. 1.
Figure 3:
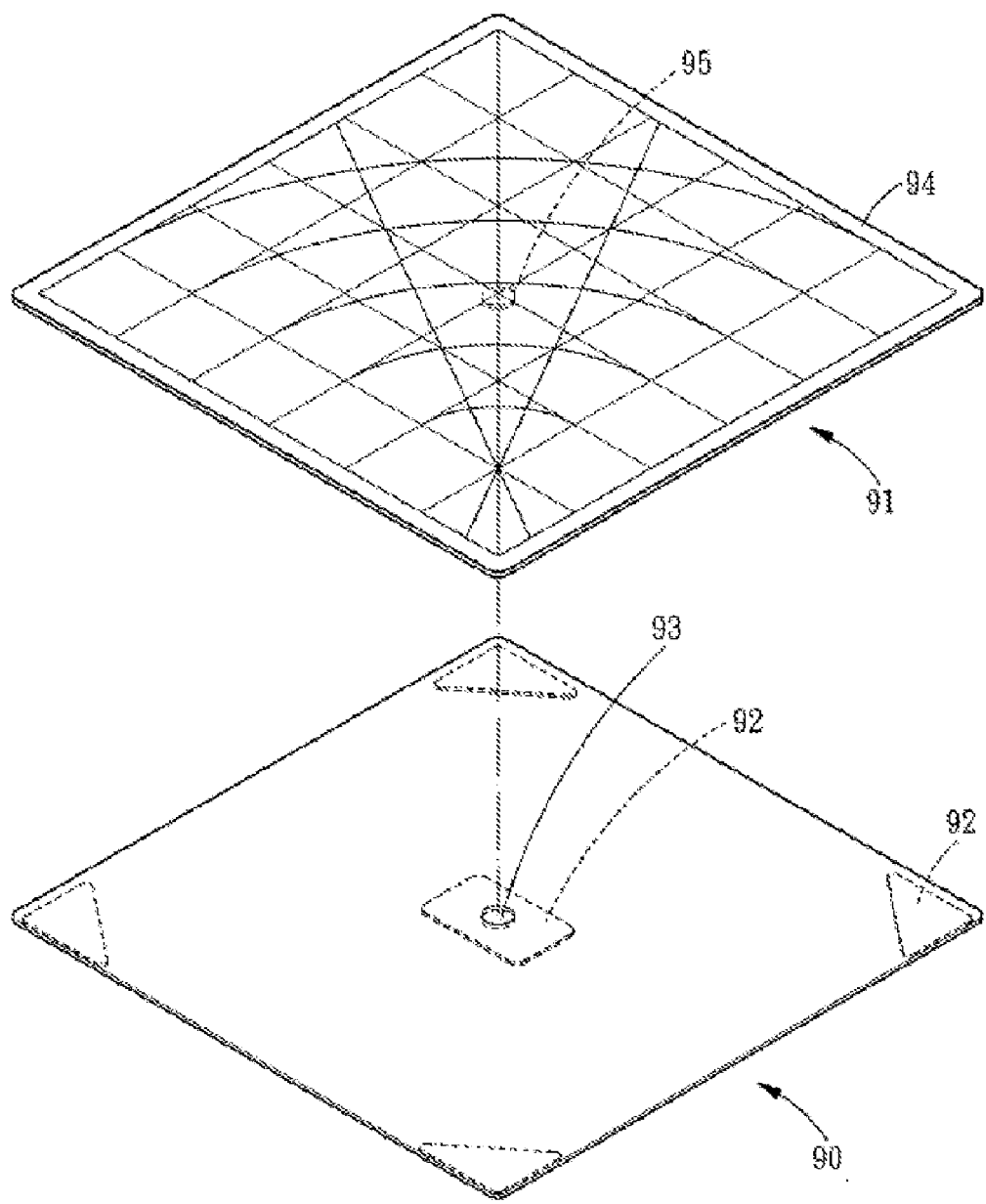
FIG. 3 is an exploded view of a conventional magnetic type cutting mat.
Figure 4:
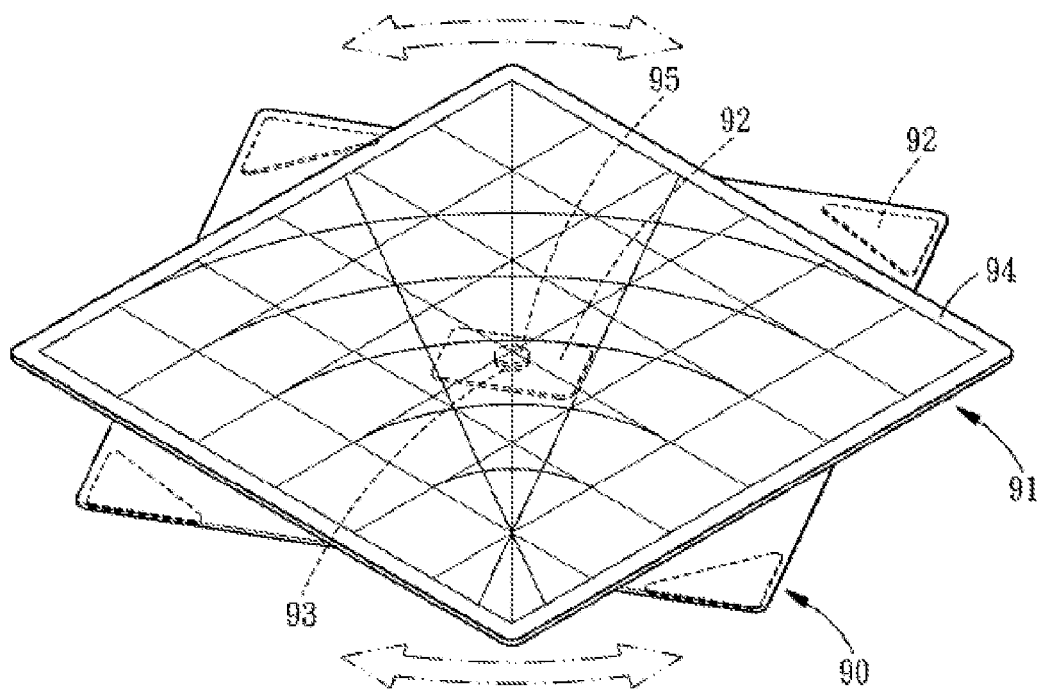
FIG. 4 is a perspective view of the conventional magnetic type cutting mat of FIG. 3.
Figure 5:
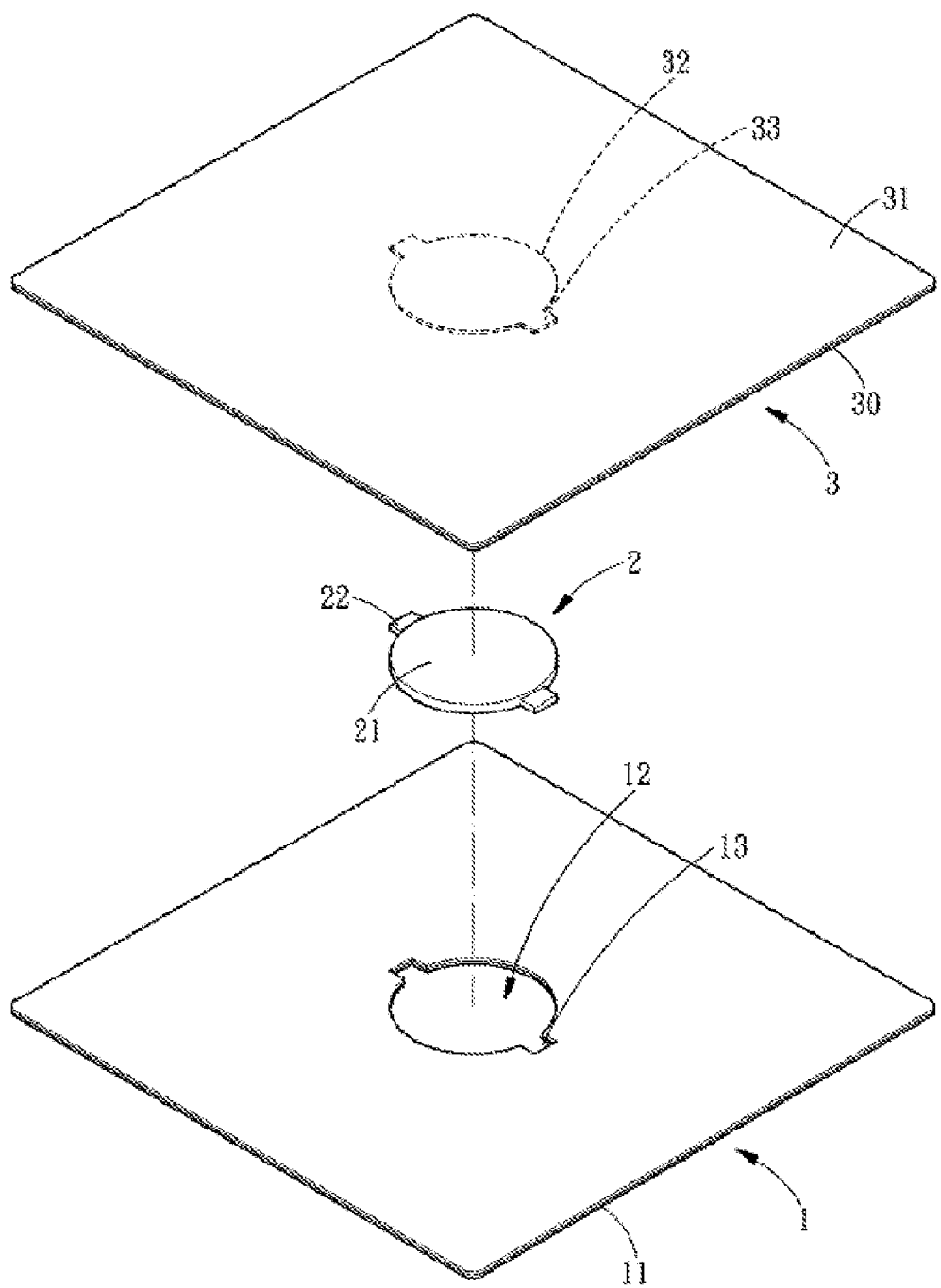
FIG. 5 is an exploded view of a cutting mat in accordance with the present invention.
Figure 6:
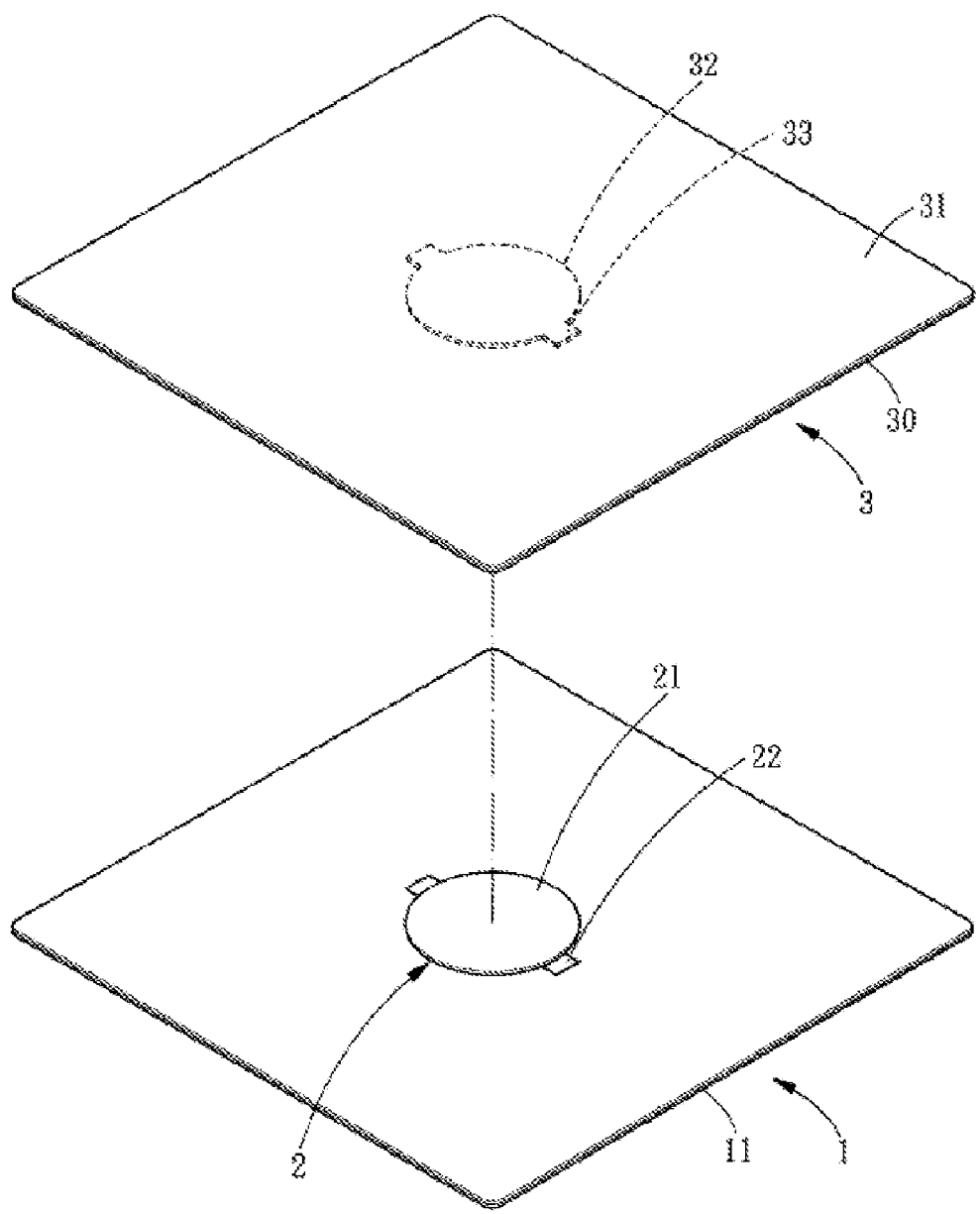
FIG. 6 is an exploded view of illustrating the first assembly manner of the cutting mat in accordance with the present invention.

The present invention will be more clear from the following description when viewed together with the accompanying drawings, which show, for purpose of illustrations only, the preferred embodiment in accordance with the present invention.

Referring to FIGS. 5-8, a cutting mat in accordance with the present invention is shown and comprises: a baseboard 1, a positioning member 2 and a cutting board 3.

The bottom surface of the baseboard 1 is covered with an antiskid layer 11, an assembling hole 12 is formed in the center of the baseboard 1, and two notches 13 are oppositely formed on both sides of the assembling hole 12.

The positioning member 2 includes a circular body 21, and two opposite positioning protrusions 22, formed on both sides of the circular body 21 for engaging with the two notches 13 of the baseboard 1. The circular body 21 of the positioning member 2 is received in the assembling hole 12 of the baseboard 1. The thickness of the circular body 21 is greater than the height of the assembling hole 12, so that the circular body 21 protrudes from the surface of the baseboard 1. The two positioning protrusions 22 are thinner than the circular portion 21 and are received in the notches 13 and are flush with a side of the baseboard 1.

The ratio between the thickness of the positioning protrusions 22 and that of the circular body 21 is greater than 1/3 but smaller than 1/2, and the thickness of the two positioning protrusions 22 is slightly smaller than the height of the notches 13 of the baseboard 1. As a result, when the positioning member 2 is assembled in the assembling hole 12 of the baseboard 1, the circular body 21 will slightly protrude from the top surface of the baseboard 1, and the two positioning protrusions 22 will be slightly lower than the top surface of the baseboard 1, thus reducing the contact area between the baseboard 1 and the cutting board 3. Furthermore, when the positioning member 2 is inversely assembled in the assembling hole 12 of the baseboard 1, it will also protrude by a certain distance above the baseboard 1 to position the cutting board 3.

The cutting board 3 includes a body 30 and a cut-proof layer 31, coated on the top surface of the body 30. The body 30 is made of hard plastic material for it to carry the soft cut proof layer 31 while maintaining the flatness of the cut proof layer 31 during cutting operation. A circular recess 32 is formed at the bottom surface of the cutting board 3 for engaging with the circular body 21 of the positioning member 2, so that the cutting board 3 is rotatably superposed on the baseboard 1. Two positioning notches 33 are formed on both sides of the circular recess 32 and located correspondingly to the positioning protrusions 22 of the positioning member 2, creating another method of assembling (as shown in FIGS. 9-11, for which the method is explained in details later).

Figure 7:
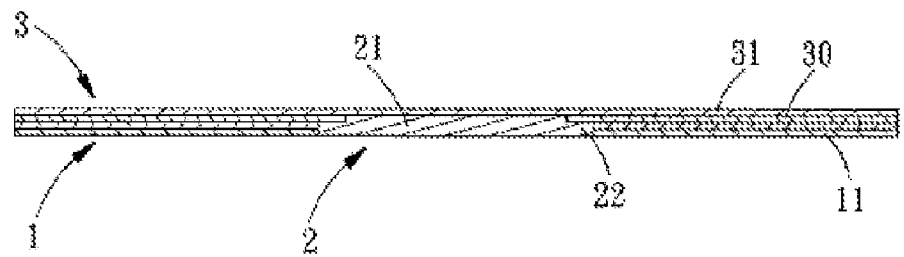
FIG. 7 is a cross sectional view of illustrating the first assembly manner of the cutting mat in accordance with the present invention.
Figure 8:
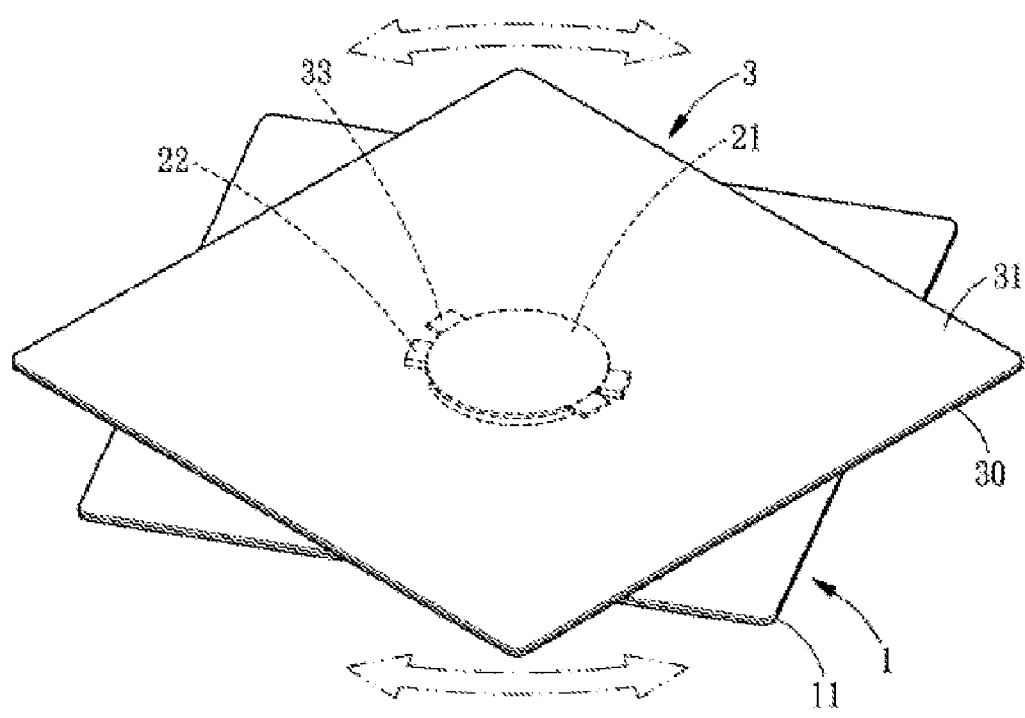
FIG. 8 is an operational view of illustrating the first assembly manner of the cutting mat in accordance with the present invention.

The cutting board 3 is stably and rotatably superposed on the baseboard 2 by the engagement of the circular groove 32 and the circular body 21, so that the user can perform arc-shaped and circular cutting on the cut proof layer 30 of the cutting board 3 (as shown in FIGS. 7 and 8).

Figure 9:
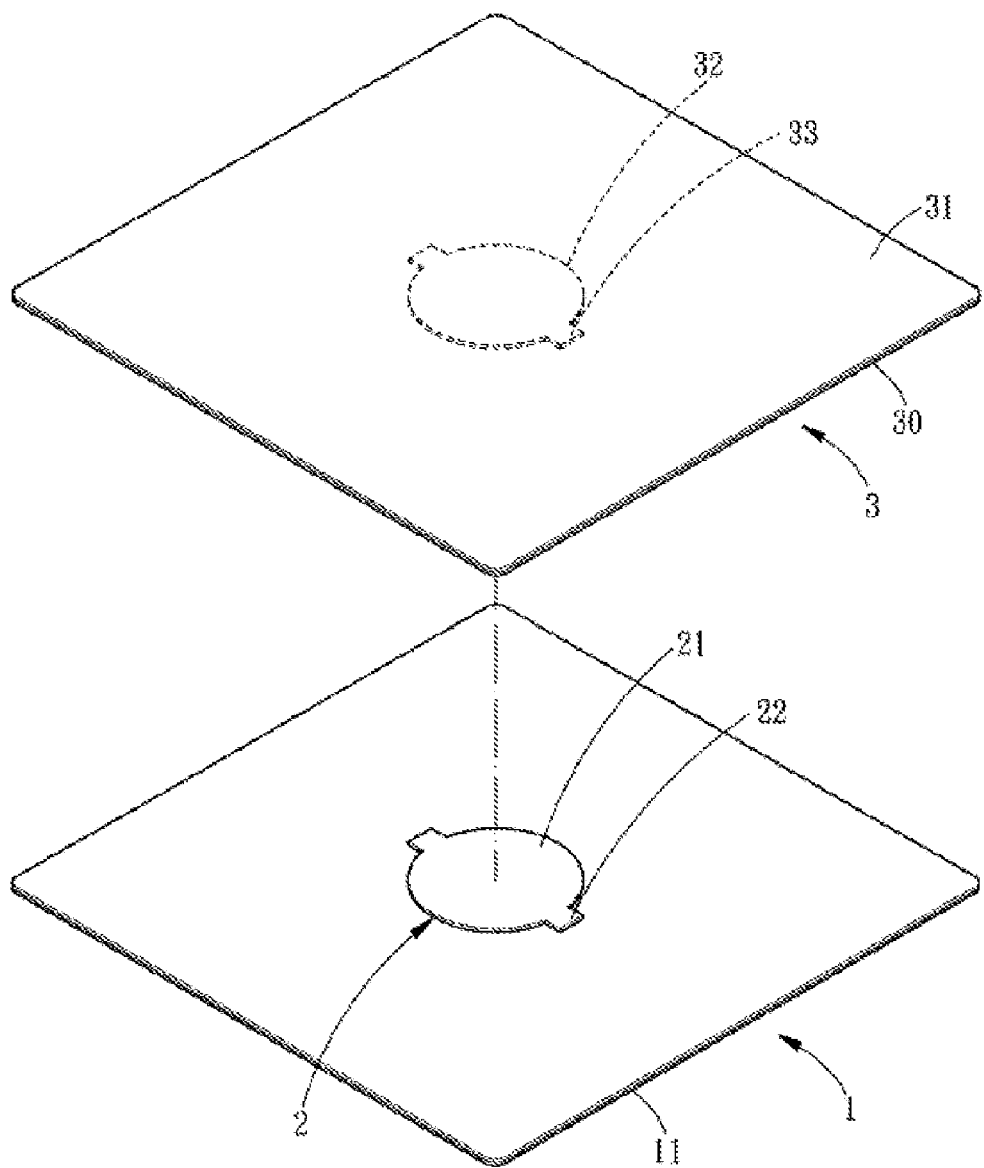
FIG. 9 is an exploded view of illustrating the second assembly manner of the cutting mat in accordance with the present invention.
Figure 10:
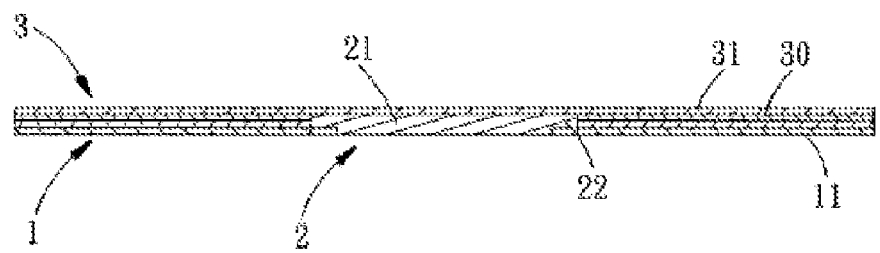
FIG. 10 is a cross sectional view of illustrating the second assembly manner of the cutting mat in accordance with the present invention.
Figure 11:
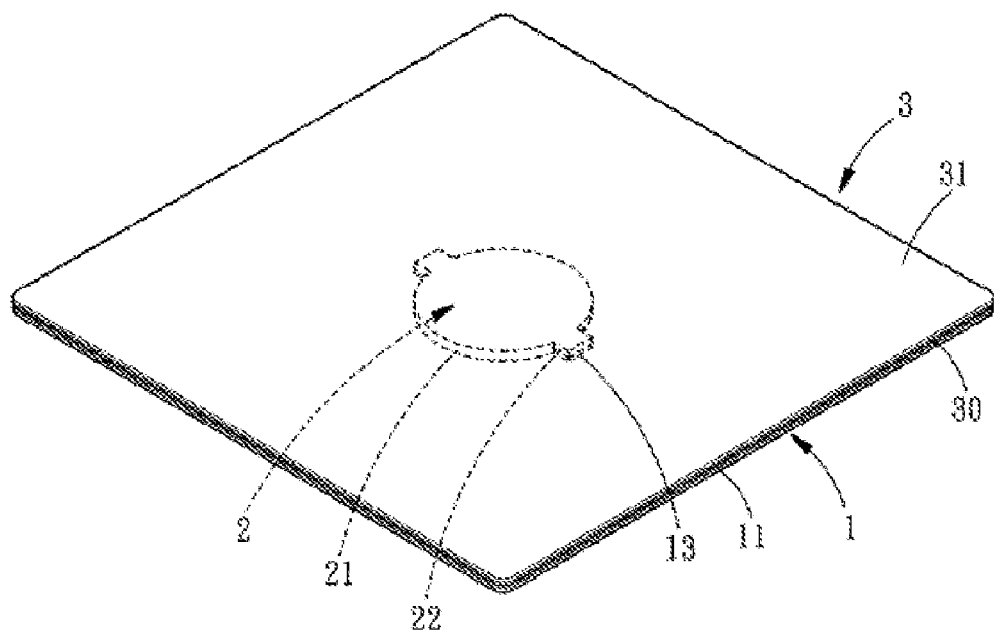
FIG. 11 is an operational view of illustrating the second assembly manner of the cutting mat in accordance with the present invention.

Referring to FIGS. 9-11, which show a second embodiment of the present invention, in this embodiment, the baseboard 1, the positioning member 2 and the cutting board 3 are structurally the same as the previous embodiment, except that the positioning member 2 is disposed in an inversed manner, different from the previous embodiment.

The circular body 21 of the positioning member 2 is assembled downward, and the positioning protrusions 22 are engaged in their corresponding notches 13 of the baseboard 1 and partially protrude out of the top surface of the baseboard 1. The circular recess 32 and the positioning notches 33 of the cutting board 3 are used to engage with the positioning member 2 and a part of the positioning protrusions 22 on the top surface of the baseboard 1. In this way, the cutting board 3 is unrotatably positioned on the baseboard 1, allowing linear cutting operation to be performed on the cut proof layer 31.

It is to be noted that the notches 13, the positioning protrusions 22 and the positioning notches 33 are equal to each other in quantity.

While we have shown and described various embodiments in accordance with the present invention, it is clear to those skilled in the art that further embodiments may be made without departing from the scope of the present invention.

What is claimed is:

1. A cutting mat comprising:
   a baseboard, a bottom surface of the baseboard covered with an antiskid layer, an assembling hole formed in the baseboard, and at least one notch formed at a side of the assembling hole;
   a positioning member including a circular body and at least one positioning protrusion formed on a side of the circular body and located correspondingly to the notch of the baseboard, the circular body of the positioning member being disposed in the assembling hole of the baseboard, a thickness of the circular body being greater than a height of the assembling hole, so that the circular body protrudes from a top surface of the baseboard, the positioning protrusion being thinner than the circular body and being received in the notch and flush with a surface of the baseboard;
   a cutting board including a body and a cut-proof layer coated on a top surface of the body, a circular recess formed at a bottom surface of the cutting board for engaging with the circular body of the positioning member, so that the cutting board is rotatably superposed on the baseboard, at least one positioning notch formed on a side of the circular recess and located in a corresponding position to the positioning protrusion of the positioning member;
   when the positioning member is inversely disposed with the positioning protrusion being protruded from the top surface of the baseboard, and the circular body and the positioning protrusion are partially received in the assembling hole and the notch of the baseboard, the circular recess and the positioning notch of the cutting board will be engaged with the positioning member and a part of the positioning protrusion, in this way, the cutting board is unrotatably positioned on the baseboard.

2. The cutting mat as claimed in claim 1, wherein the ratio between the thickness of the positioning protrusion and that of the circular body is greater than 1/3 but smaller than 1/2, and the thickness of the positioning protrusion is slightly smaller than the height of the notches of the baseboard.

* * * * *